March 31, 1970  S. I. MacDUFF  3,503,657

DUAL RATIO LOAD SENSING PROPORTIONING VALVE

Filed Jan. 27, 1969  2 Sheets-Sheet 1

INVENTOR.
STANLEY I. MAC DUFF
BY
ATTORNEY

March 31, 1970 S. I. MacDUFF 3,503,657
DUAL RATIO LOAD SENSING PROPORTIONING VALVE
Filed Jan. 27, 1969 2 Sheets-Sheet 2
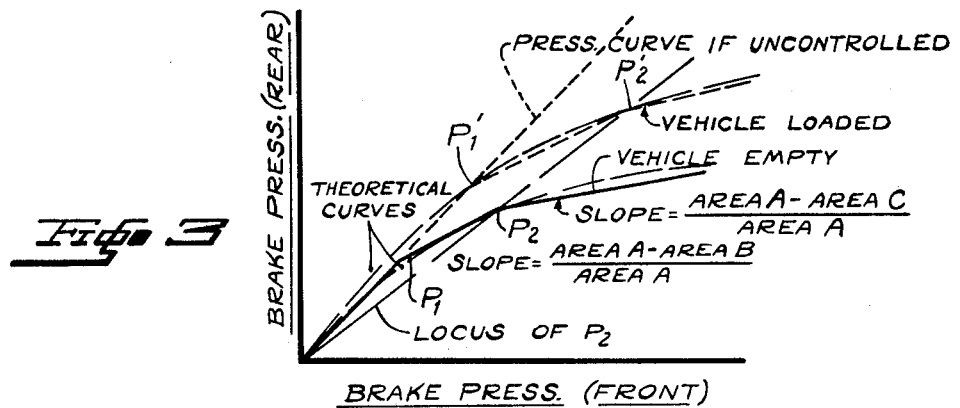
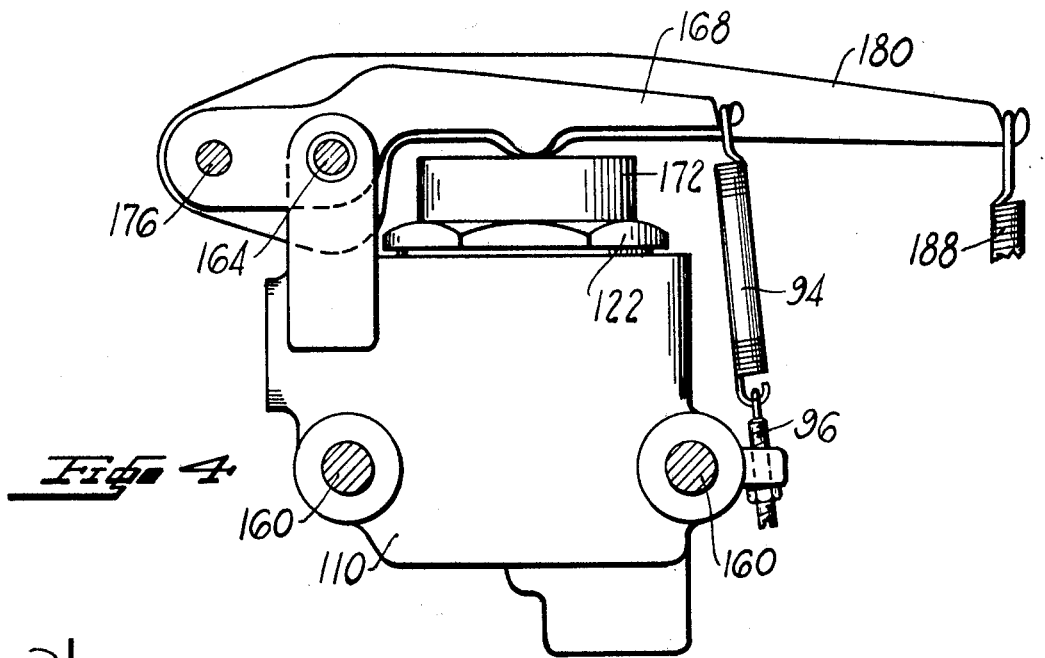
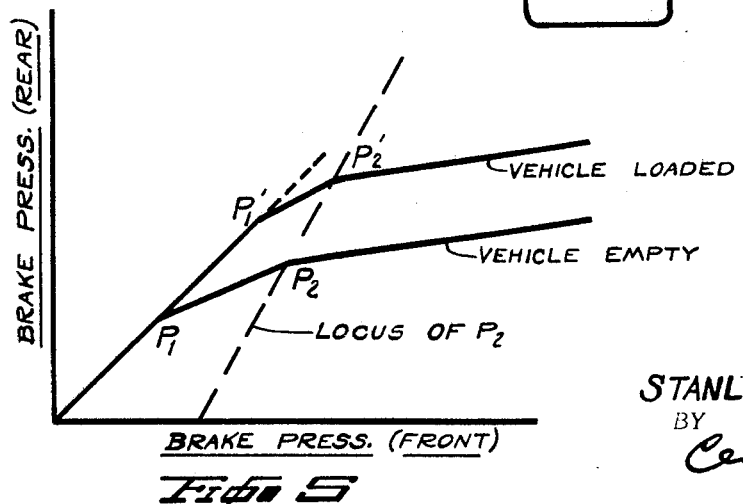
INVENTOR.
STANLEY I. MAC DUFF
BY
ATTORNEY United States Patent Office 3,503,657
Patented Mar. 31, 1970

3,503,657
DUAL RATIO LOAD SENSING PROPORTIONING VALVE
Stanley I. MacDuff, South Bend, Ind., assignor to The Bendix Corporation, a corporation of Delaware
Filed Jan. 27, 1969, Ser. No. 795,146
Int. Cl. B60t 8/18
U.S. Cl. 303—22          8 Claims

ABSTRACT OF THE DISCLOSURE

A load sensing proportioning valve especially applicable to braking systems of ground vehicles which has a differential pressure responsive means regulated by a load sensitive mechanism also controlling a device to vary the characteristics of the pressure responsive means to approximate ideal pressure requirements for maximum work of a motor such as are employed, for example, for actuating brakes for ground vehicles.

Summary

Figure 1:
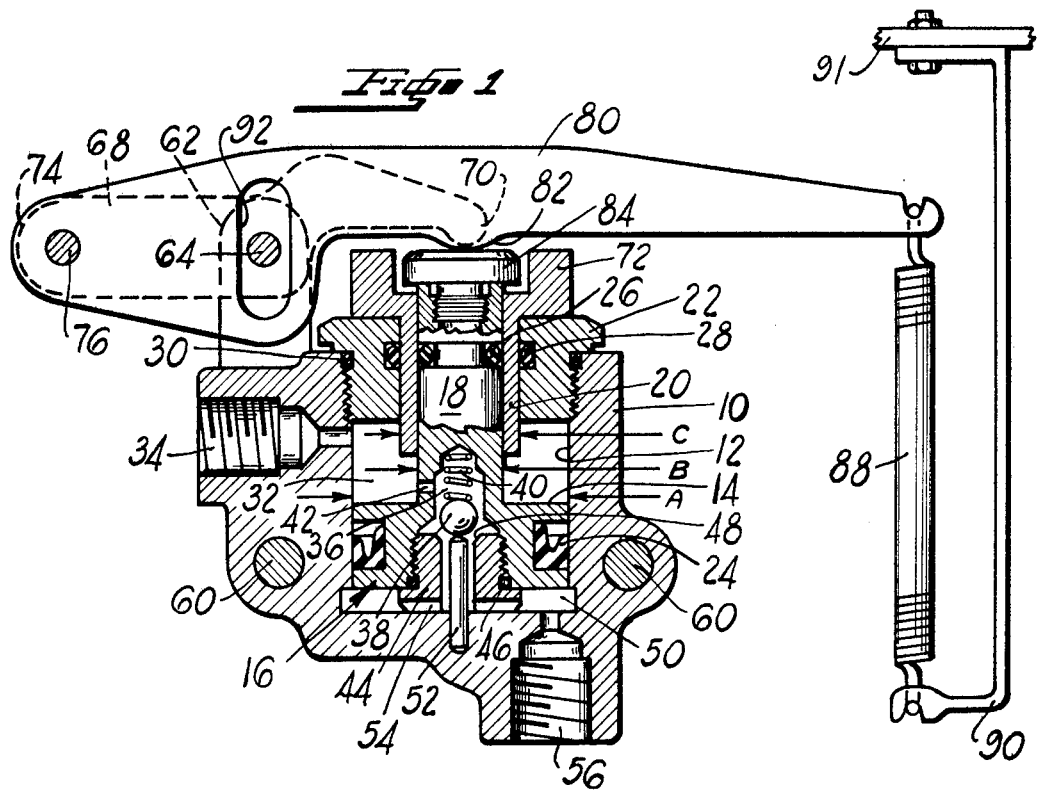

Load sensing proportioning valves are well known in the automotive brake art and one form of such a valve is illustrated and described in a Mr. L. J. Larsen's U.S. patent application Ser. No. 756,259 assigned to the common assignee and relating to an anti-skid braking system. Another form of such a device is shown as FIGURE 2 of the P. A. G. Lepelletier Patent 3,379,479. This invention is intended to be an improvement over the devices just referred to.

The device shown in the Larsen application produces a characteristic curve consisting of two straight lines. As braking is initiated, the front and rear brake pressures rise equally to a certain point determined by the load on the actuating spring, and from that point on the rear brake pressure rises in a straight line at a lesser rate determined by the ratio of areas of the stepped piston.

The Lepelletier patent shows the first improvement on this device by the addition of a sliding sleeve which is first held in contact with the valve body by what he calls a calibration spring and, at some supply pressure, responds to hydraulic force to move in opposition to the calibration spring and engage an abutment on the stepped piston. From this point the sleeve and piston operate as if they were an integral stepped piston having a different area ratio. As a result, the characteristic operating curve produced by this device consists of three straight lines. When braking pressure is initiated, the front and rear brake pressures first increase equally to some point, which we can call $P_1$, after which the rear brake pressure increases less rapidly based upon the ratio of areas of the stepped piston without the sleeve. At another higher input pressure determined by the area of the sleeve and the force of the calibration spring, which we can call $P_2$, the rear brake pressure rises even less rapidly in proportion to the ratio of the combined sleeve and stepped piston.

In both the Larsen and Lepelletier disclosures, the first break point in the operating curve ($P_1$) is located in accordance with the load exerted by springs connected from a body or frame mounted element to an axle mounted element. As a result of this, the break point is varied in proportion to the load being supported by the rear wheels. In Lepelletier's, the second break in the curve ($P_2$) is determined by two fixed factors, which are the area of the sleeve and the installed load of the calibration spring. As a result of this, it is relatively difficult to tailor the operating curves accurately to the theoretical curves of a vehicle at both minimum and maximum weights (loaded and empty).

An object of my invention is to make the function of the Lepelletier sleeve also dependent upon the load being carried by the rear wheels. Or, in other words, control the action of the sleeve by the force of the load sensing spring which also controls the initial action of the stepped piston.

Description

Figure 2:
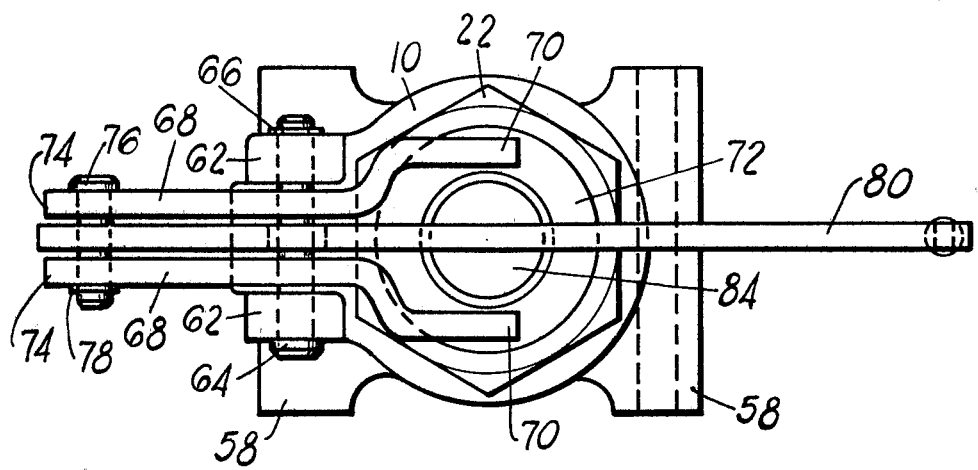

These objects and others will appear to those skilled in the art from the following description of the two embodiments thus far visualized and shown by the accompanying drawings in which:

FIGURE 1 is a vertical cross-sectional view of a valve;
FIGURE 2 is a top view of the valve;
FIGURE 3 is a graph of characteristic curves of the illustrated valve;
FIGURE 4 is an elevational side view of a modification of my invention; and
FIGURE 5 is a graph of performance characteristics of the modified valve shown in FIGURE 4.

Referring to the drawings, the valve consists of a body 10 having a longitudinal bore 12 which slidably receives the enlarged head 14 of a stepped piston 16. The smaller diameter of the stepped piston or stem is designated 18 and it projects slidably through the bore of a sleeve member 20, which, in turn, is slidable in a bore in a nut 22 which is threaded into the end of the valve body 10 with the before mentioned bore concentrically located in relation to the bore 12 in the body. The enlarged end 14 of the stepped piston divides the bore 12 into two cavities and the said piston head 14 is provided with a seal 24 seated in a suitable groove having lips oriented in such a direction that pressure in the upper cavity will be prevented from communicating past the seal to the lower cavity, but a higher pressure in the lower cavity may freely communicate past the seal to the upper cavity. By this means, the said seal 24 serves not only as a seal but as a check valve.

An O ring 26 installed in a suitable groove formed in the stem 18 of the stepped piston 16 seals the clearance between said stem and the bore of the sleeve 20. Another O ring 28 in a groove formed in the bore of the nut member 22 seals the clearance between the outside diameter of the sleeve 20 and the bore of said nut. A suitable gasket 30 seals the threads of said nut against leakage of fluid from said cavities.

The upper cavity (which I will designate 32) formed by the bore 12 and piston 16 receives fluid from the vehicle master cylinder through a threaded port 34. The piston 16 is formed with a concentric central recess 36 containing a ball 38 and a spring 40. A radial passage 42 admits fluid from the cavity 32 into the recess 36. A threaded plug 44 having a concentric passage therethrough is threaded into the bottom of the recess 36 and is sealed with a suitable gasket 46. The upper end of this threaded plug is formed with a conical seat 48 which is adapted to receive the ball 38 in sealing engagement to prevent passage of fluid from the recess to the lower cavity (which I will designate 50) formed by the bore 12 and the piston 16. A pin 52 is secured to the end wall of the housing which forms the bottom of cavity 50 and projects through the central passage in the threaded plug 44 in such a way as to lift the ball 38 away from the seat 48 when the piston is in its lowermost position with the head of the threaded plug 44 in contact with the bottom of said cavity. A transverse slot 54 formed in the head of the plug permits free fluid passage under these conditions from the central recess 36 to the cavity 50.

A threaded port 56 communicating with the cavity 50 is connected by suitable conduits or tubing to the wheel cylinders of the rear brakes of the vehicle. The casting 10 is formed with drilled bosses 58 by means of which it may be attached by suitable bolts 60 to a bracket on the axle of a vehicle. The casting 10 is also formed with two ears 62 formed with a transverse bore containing a pivot pin 64 secured in place by a snap ring 66.

Pivotally mounted on said pin between said ears are a pair of levers 68, the right hand ends 70 being formed to engage an enlarged flange 72 forming the external portion of the sleeve 20. The left hand ends 74 of the levers 68 are formed with a transverse hole in which is installed a pivot pin 76 secured by a snap ring 78. An actuating lever 80 is pivotally mounted on the pin 76 between the levers 68 and extends across the top of the valve where it is formed with a radiused projection 82 which contacts an enlarged head 84 of a threaded member screwed into the end of the stem 18 of the stepped piston 16. The actuating lever 80 extends to the right beyond the valve body and is formed with a notch 86 adapted to receive the hook of a suitable tension spring 88, the other end of which is secured to a bracket 90 which, in turn, is secured to a portion of the frame 91 of the vehicle. Where the lever 80 passes the pivot pin 64, it is formed with a large clearance opening 92.

The operation of the device is as follows: It should be understood that the spring 88 is of such character that it exerts a positive downward load on the lever 80 at all times throughout the maximum range of movement that can exist between the vehicle axle and body. This downward force results in the application of a downward force to the enlarged head 84 of the screw threaded into the stem 18 of the piston 16, whereby the piston is urged downwardly to the bottom of the cavity 50 and the ball 38 is, in consequence, lifted from the seat 48. The same downward force of the spring results in the application of an upward force on the left hand ends 74 of the levers 68 through the medium of the pivot pin 76. The upward force exerted through the pin 76 tends to rotate the links 68 in a clockwise direction about the pivot pin 64 which operably secures said links to the ears 62 of the valve body 10. This tendency of clockwise rotation causes the right hand ends 70 of the links 68 to exert downward force on the flange 72 of the sleeve 20. When the vehicle is lightly loaded, the body will have raised in relation to the axle, resulting in a shortening of the spring 88 and reduction of the force exerted on lever 80. A similar shortening also occurs when the vehicle is decelerated by operation of the brakes, since this deceleration causes an apparent weight shift to occur from the rear wheels to the front wheels. When the vehicle is heavily loaded, the spring 88 is extended further and the force exerted on the lever 80 is increased.

When the brakes are first applied, fluid from the master cylinder enters the threaded port 34 and passes into the cavity 32. From there it passes freely through radial passage 42 into the central recess 36, past ball 38 which is, as previously described, lifted from its seat 46 and enters the lower cavity 50 from whence it passes through the threaded port 56 to the wheel cylinders. As fluid enters the brake wheel cylinders in the normal operation of conventional brakes, the pressure in the system rises as a result of the shoes coming in contact with the friction surface of the drum or disc. As the pressure rises in the cavities 32 and 50, a net hydraulic force is exerted on the stepped piston 16 equal to the area of the stem (diameter B) times the system pressure. When this force equals the force exerted by the spring 88 through lever 80, the piston 16 will tend to rise, whereupon the ball 38 comes into sealing engagement with its seat 48, thereby preventing communication between the cavities 32 and 50.

Now, if pressure is further increased from the master cylinder, the rise in pressure in cavity 32 creates a downward force dependent upon the area of the annulus between the stem 18 of the piston 16 and the enlarged head 14. This annulus is determined by diameter A less diameter B. This force tends to move the piston downward again, raising the ball sufficiently to permit fluid to pass again into cavity 50. However, since the area exposed to pressure in cavity 50 is greater than the previously defined annular area, a lesser increase in pressure in cavity 50 counterbalances the downward force of the increased pressure in cavity 32, raising the piston again slightly and seating the ball. Thus, it will be seen that from this point onward, instead of pressures in the two cavities rising together, the pressure in cavity 50 will always increase by an increment determined by the ratio of area A minus area B over area A.

During this phase of operation of the valve, the shoulder formed by the flange 72 of the sleeve 20 remains in contact with the upper surface of the nut 22 under the influence of the downward force exerted by the levers 68. However, the increased hydraulic pressure in the cavity 32 is also exerting an upward force on the sleeve 20 which is equal to the area of diameter C minus the area of diameter B times the said pressure. The leverage ratios of the links 68 and the area of the exposed end of the sleeve are so proportioned that this upward hydraulic force will exceed the downward force exerted by the lever 68 at some higher pressure in cavity 32 than the pressure at which the stepped piston began to move. When this higher pressure is attained, however, the sleeve will move upward until the flange 72 comes into contact with the enlarged head 84 of the stem 18 of the stepped piston 16. The result of this is that the stepped piston now responds to further increases of pressure in the cavity 32 as if its stem were now equal to diameter C instead of diameter B and the slope of the pressure curve will now be determined by the ratio of area A minus are C divided by area A, which ratio is less than the ratio of the preceding portion of the curve whereby the resulting slope of the curve is also less. When the vehicle is heavily loaded, resulting in an increase in the force of the spring 88, it is obvious that the pressure at which the sleeve will initiate its function will increase, unlike the condition which occurs with the Lepelletier device. This makes it possible to more accurately tailor the actual curves to the theoretical curves for certain types of vehicles.

FIGURE 4 is a partial view similar to FIGURE 1, showing how an auxiliary spring can be connected to the levers 68 to introduce a fixed calibrating force to govern the function of sleeve 20 in addition to the variable force derived from the spring 88. In this figure, in which similar parts have been designated by the same numerals plus 100, one of the levers 168 is shown provided with extension 92 to which a spring 94 is attached, the other end of the spring being attached to an adjusting screw 96 threaded into a boss formed as a part of the value body 110.

FIGURE 5 shows characteristic curves which would be produced by a valve equipped with this supplementary calibrating spring. Referring again to FIGURE 3, the first point of inflection of the curves where the stepped piston begins to function may be designated $P_1$ for an empty vehicle of $P_1'$ for a loaded vehicle. The second point of inflection which defines the pressure at which the sleeve 20 initiates its function may be designated $P_2$ for an empty vehicle or $P_2'$ for a loaded vehicle.

In FIGURE 3 it should be noted that the points $P_2$ and $P_2'$ lie on a line extending from the origin of coordinates. In FIGURE 5 it will be observed that similar points $P_2$ and $P_2'$ will lie on a straight line which does ont intersect the origin. By making such design changes as varying the linkage ratio of the levers 168 and/or adding constant spring force by means of the spring 94, it is possible to make the locus of points $P_2$ follow any straight line lying between that shown in FIGURE 3, and a vertical line such as that shown by Lepelletier. In FIGURE 4, for example, the distance between pivot pins 164 and 178 has been shortened, whereby the force of spring 188 acting upon the flange 172 via lever 168 of the sleeve 20 is substantially reduced. The addition of a constant force applied by means of the spring 94 will cause the locus of points $P_2$ to be displaced from the origin of coordinates. Thus, it should be understood that I have shown a device which is capable of being varied to effectively tailor its operating characteristics to almost any imaginable vehicle characteristics.

I claim:
1. A load sensing proportioning valve comprising:
   a housing having a fluid inlet and a fluid outlet for a cavity therewithin;
   a pressure responsive valve means within said cavity having a first effective area and a second effective area for first and second chambers respectively connected to the fluid inlet and the fluid outlet and via a valve passage within said means to each other;
   a pressure responsive piston operatively connected to said means to be effective to vary the first effective area of said means; and
   a load referencing device having a first element pivotally connected to said housing with an end thereof operatively connected to said piston and a second element pivotally connected to another end of said first element and operatively connected to said pressure responsive means.
2. The structure of claim 1 wherein said load referencing device includes a spring whose force is a function of load and load shifts.
3. The structure of claim 2 wherein said spring is mounted to be an effective bias on said means and said piston in a direction the same as pressure in said first chamber on said means and opposite the same pressure on said piston.
4. A means between a fluid pressure source and a motor to be operated thereby controlling deceleration of a loaded structure, said means comprising:
   a housing having an open ended cavity with a fluid inlet and a fluid outlet thereto;
   a valve assembly within said cavity dividing same into a first variable volume chamber and a second variable volume chamber which valve assembly is reciprocable within a sleeve piston within a plug closing the cavity;
   lever means comprising a first portion pivoted to said housing to have an end abutting said sleeve piston and a second portion pivoted to said first portion to have an abutting connection via a transverse arm with said valve assembly; and
   spring means connecting said arm to said structure to bias said valve means in the same direction as the pressure acting thereon from said source which is opposing the action of said spring on said sleeve whereby the position of the valve assembly and the sleeve is a function of load on the structure.
5. The structure as defined in claim 1 and further comprising a biasing means connected between said housing and said piston to oppose pressure from said inlet thereon.
6. The structure as defined in claim 2 and further comprising a biasing means connected between said housing and said piston to oppose pressure from said inlet thereon.
7. The structure as defined in claim 3 and further comprising a biasing means connected between said housing and said piston to oppose pressure from said inlet thereon.
8. The structure as defined in claim 4 and further comprising a biasing means connected between said housing and said piston to oppose pressure from said inlet thereon.

References Cited

UNITED STATES PATENTS

| 3,362,758 | 1/1968 | Goerke et al. | 303—22 |
| 3,379,479 | 4/1968 | Lepelletier | 303—22 |
| 3,405,978 | 10/1968 | Lepelletier | 303—22 |

MILTON BUCHLER, Primary Examiner

J. J. McLAUGHLIN, Jr., Assistant Examiner

U.S. Cl. X.R.

137—503, 505.15; 188—152; 303—6